United States Patent
Powell et al.

[11] Patent Number: 6,056,009
[45] Date of Patent: May 2, 2000

[54] FLUID PRESSURE REGULATOR

[75] Inventors: Alvin Arthur Powell, Burton; James Witherspoon Mitchell, Jr., Wayne; Robert Eugene Wattleworth, Canton, all of Mich.

[73] Assignee: Ford Motor Company, Dearborn, Mich.

[21] Appl. No.: 08/462,331

[22] Filed: Jun. 5, 1995

[51] Int. Cl.[7] .................................................. G05D 16/02
[52] U.S. Cl. ....................................................... 137/505.42
[58] Field of Search ................................ 137/505.42, 505

[56] References Cited

U.S. PATENT DOCUMENTS

| | | | |
|---|---|---|---|
| 167,212 | 8/1875 | Bates | 137/505.42 |
| 1,518,984 | 12/1924 | Kien | 137/510 |
| 2,313,564 | 3/1943 | Manly | 137/505.42 X |
| 2,348,388 | 5/1944 | Jenkins | 137/505.42 |
| 2,876,793 | 3/1959 | Vanderpoel et al. | 137/505.42 |
| 3,921,664 | 11/1975 | Almquist | 137/505.12 |
| 4,094,337 | 6/1978 | Robinson | 137/505.42 |
| 4,237,924 | 12/1980 | Benjamin et al. | 137/510 |
| 4,431,026 | 2/1984 | Fehrenbach et al. | 137/510 |
| 4,627,463 | 12/1986 | Johnstone | 137/510 |
| 4,653,528 | 3/1987 | Field et al. | 137/510 |
| 4,741,360 | 5/1988 | Affeldt et al. | 137/510 |
| 4,936,342 | 6/1990 | Kojima et al. | 137/510 |
| 5,111,793 | 5/1992 | Deeds | 123/457 |
| 5,113,831 | 5/1992 | Grant | 123/457 |
| 5,163,472 | 11/1992 | Takada et al. | 137/510 |
| 5,193,576 | 3/1993 | Mosby | 137/507 |
| 5,213,126 | 5/1993 | Ono et al. | 137/510 |
| 5,220,941 | 6/1993 | Tuckey | 137/510 |
| 5,265,644 | 11/1993 | Tuckey | 137/510 |
| 5,279,327 | 1/1994 | Alsobrooks et al. | 137/510 |
| 5,291,822 | 3/1994 | Alsobrooks et al. | |
| 5,398,655 | 3/1995 | Tuckey | 123/456 |

FOREIGN PATENT DOCUMENTS

| | | |
|---|---|---|
| 29 12 799 | 3/1979 | Germany. |
| 62-225763 | 10/1987 | Japan. |
| 5-263732 | 10/1993 | Japan. |

*Primary Examiner*—Stephen M. Hepperle
*Attorney, Agent, or Firm*—Rhonda L. McCoy-Pfau

[57] ABSTRACT

A "returnless" fuel system for a motor vehicle is disclosed. A "series-pass" fuel regulator in the system includes an internal fluid passage containing a fluted pin and having a valve seat at one end. A valve ball bears against one end of the fluted pin and is biased toward the valve seat by a valve spring. The other end of the fluted pin bears against a diaphragm assembly. A main spring resists the movement the diaphragm assembly in the direction away from the fluted pin. The internal fluid passage in the regulator communicates with a chamber defined by the diaphragm assembly, the chamber further communicating with the outlet of the regulator. The inlet of the regulator communicates with the internal fluid passage when the valve ball is not seated against the valve seat and does not so communicate when the valve ball is seated against the valve seat.

20 Claims, 1 Drawing Sheet

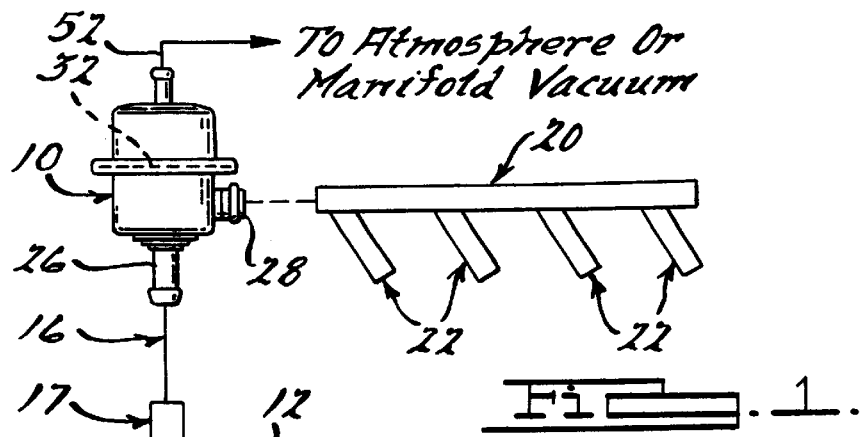
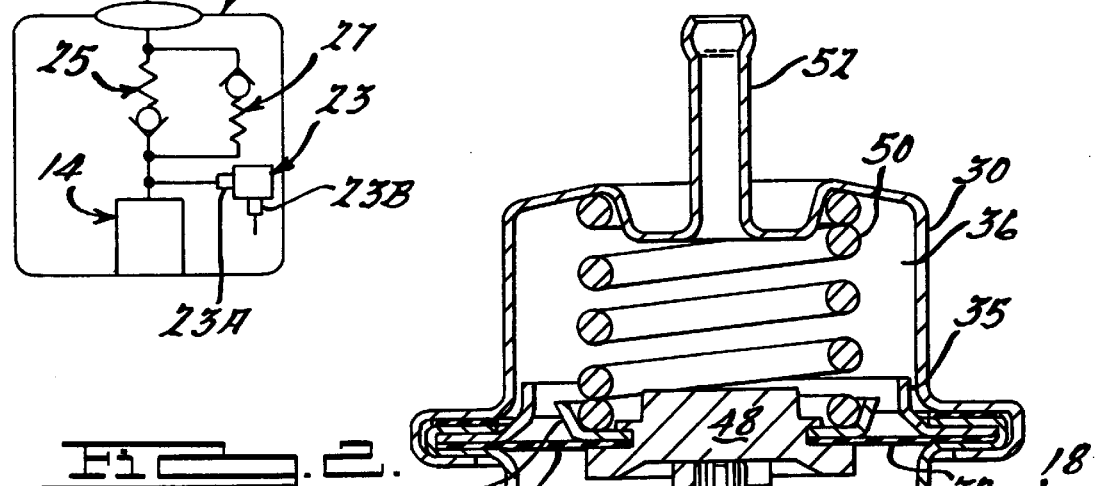
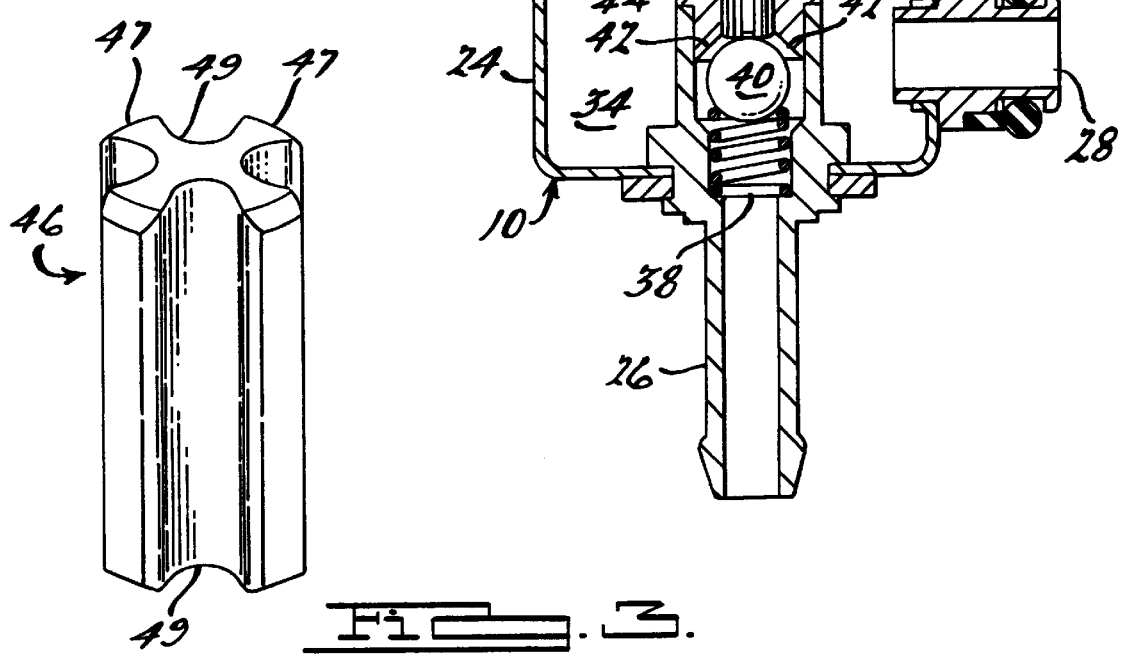
Fig. 1.
Fig. 2.
Fig. 3.

FLUID PRESSURE REGULATOR

BACKGROUND OF THE INVENTION

1. Field of the Invention

The present invention relates to fluid pressure regulators.

2. Description of the Related Art

In the continuing effort to reduce emissions from motor vehicles, "returnless" fuel systems are seen as a promising way to do so. A conventional fuel system has a fuel line connecting a fuel pump with a fuel rail on the engine of the motor vehicle. Connected to the fuel rail are one or more fuel injectors. A second fuel line runs from the fuel rail to the fuel tank of the motor vehicle to return unused fuel to the fuel tank. This fuel that returns to the fuel tank has often been heated by the heat of the engine. One disadvantageous result from an emissions standpoint is the accumulation of fuel vapor in the fuel tank due to the return of heated fuel.

Returnless fuel systems eliminate the fuel line which returns fuel from the fuel rail to the fuel tank. Instead, the fuel system is designed to supply the proper amount of fuel to the fuel rail, so there is no excess.

In order to regulate the fuel pressure at the fuel rail in a returnless system, a pressure regulator in series with the fuel supply line (a so-called "series-pass" or "demand" regulator) can be advantageous. Being in series with the fuel supply line, such a regulator would not regulate pressure in a more conventional "bypass" manner. Bypass regulators themselves return excess fuel to the fuel tank in the process of regulating pressure.

One proposed design for a series-pass regulator is illustrated in U.S. Pat. No. 5,398,655, issued to Tuckey. Although this design has the potential to be effective as a pressure regulator, other designs may be more manufacturable and less costly. Therefore, alternate designs for series-pass fuel pressure regulators may be advantageous.

SUMMARY OF THE INVENTION

The present invention provides a fluid pressure regulator comprising an upper chamber and a lower chamber separated by a flexible diaphragm assembly. The fluid pressure regulator also comprises a fluid passage having a first end and a second end, the first end communicating with the lower chamber. Also, the fluid pressure regulator includes a rigid member disposed within the fluid passage, the rigid member having a first end and a second end, the first end bearing against the diaphragm assembly, the rigid member further being porous to fluid flow through the fluid passage. Additionally, the fluid pressure regulator comprises a valve seat located at the second end of the fluid passage and a valve ball bearing against the second end of the rigid member. The fluid pressure regulator further comprises a valve spring exerting a force on the valve ball toward the valve seat. In addition, the fluid pressure regulator includes a main spring exerting a force on the diaphragm assembly opposing movement of the diaphragm assembly toward the upper chamber. Also, the fluid pressure regulator comprises a fluid inlet in communication with the fluid passage when the valve ball is away from the valve seat and not in communication with the fluid passage when the valve ball is seated against the valve seat. Further, the fluid pressure regulator includes a fluid outlet communicating with the lower chamber.

The present invention also provides a second fluid pressure regulator. This fluid pressure regulator includes an upper chamber and a lower chamber separated by a flexible diaphragm assembly and a fluid passage having a first end and a second end, the first end communicating with the lower chamber. The regulator also comprises a rigid member disposed within the fluid passage, the rigid member having a first end and a second end, the first end bearing against the diaphragm assembly, the rigid member further being porous to fluid flow through the fluid passage. Also, the regulator includes a valve seat located at the second end of the fluid passage and a valve stopper bearing against the second end of the rigid member. Further, the regulator comprises a valve spring exerting a force on the valve stopper toward the valve seat and a main spring exerting a force on the diaphragm assembly opposing movement of the diaphragm assembly toward the upper chamber. Additionally, the regulator has a fluid inlet in communication with the fluid passage when the valve stopper is away from the valve seat and not in communication with the fluid passage when the valve stopper is seated against the valve seat. The regulator also includes a fluid outlet communicating with the lower chamber. In this regulator, the rigid member is mechanically coupled to neither the diaphragm assembly nor the valve stopper.

The present invention provides "series-pass" fluid pressure regulation in a highly manufacturable and cost-effective design. In doing so, the present invention provides advantages over alternative designs.

BRIEF DESCRIPTION OF THE DRAWINGS

FIG. 1 is a schematic drawing showing a returnless fuel system of a motor vehicle.

FIG. 2 is a sectional view of fuel pressure regulator 10 of FIG. 1.

FIG. 3 is a perspective view of fluted pin 46 of FIG. 2.

DETAILED DESCRIPTION OF THE PREFERRED EMBODIMENT

Referring to FIG. 1, a returnless fuel system for a motor vehicle is illustrated. Pressure regulator 10 is a "series-pass" type of pressure regulator. That is, pressure regulator 10 is preferably used in series in a fuel line, to regulate the fuel pressure downstream from the regulator. Such a "series-pass" fuel regulator is of particular advantage in a so-called "returnless" fuel system.

The fuel system of FIG. 1 includes a fuel tank 12, fuel pump 14, fuel line 16, in-line fuel filter 17, pressure regulator 10, fuel rail 20 and one or more fuel injectors 22. Pressure regulator 10 is preferably directly connected to fuel rail 20, without an intermediate fuel line. The defining characteristic of "returnless" fuel systems is that there is no fuel line returning unused fuel from fuel rail 20 to fuel tank 12.

Further, a bypass-type fuel pressure regulator 23 can be employed to provide a regulated fuel pressure in fuel line 16 for series-pass regulator 10. Bypass regulator 23 can be of any conventional design known to the art. Examples of some such bypass regulator designs are found in U.S. Pat. No. 5,163,472, issued to Takada et al.; U.S. Pat. No. 5,193,576, issued to Mosby; and U.S. Pat. No. 4,936,342, issued to Kojima et al. Bypass regulator 23 regulates the pressure at its input 23A and returns excess fuel from fuel pump 14 via outlet 23B to fuel tank 12. The use of such a bypass regulator 23 is preferable to the alternative of using a simple pressure relief valve because a bypass regulator will provide superior fuel pressure regulation. Bypass regulator 23 is designed to regulate the pressure at its input 23A to provide a high enough pressure for pressure regulator 10 to operate.

Additionally, a check valve 25 can be provided in order to hold pressure in fuel line 16 when fuel pump 14 turns off. Check valve 25 can be located as shown, downstream from inlet 23A of bypass regulator 23, if pressure bleed-down through bypass regulator 23 is a concern. Such bleed-down can occur, for example, through fuel contaminants which may be trapped in bypass regulator 23, holding bypass regulator 23 partially open after fuel pump 14 turns off. With check valve 25 located downstream from bypass regulator 23 as shown, pressure relief valve 27 is preferably also employed. As will be described in detail below, pressure relief valve 27 facilitates the relief of overpressure conditions in fuel rail 20. Preferably, check valve 25 and pressure relief valve 27 are both of the simple ball-and-spring variety. Also, check valve 25 and pressure relief valve 27 can be integrated into a single assembly. Such an assembly is disclosed in co-pending U.S. patent application Ser. No. 08/287,034, filed Aug. 8, 1994, the disclosure of which is hereby incorporated by reference.

To minimize fuel line connections outside fuel tank 12, bypass regulator 23, check valve 25 and pressure relief valve 27 are preferably located within fuel tank 12. Of course, if immersed in gasoline when so located, these components must be constructed of materials which can withstand such immersion.

Check valve 25 can alternatively be integrated into fuel pump 14 if fuel pressure bleed-down through bypass regulator 23 is not a significant likelihood. In that event, pressure relief valve 27 can be eliminated.

One skilled in the art will recognize that the location of fuel filter 17 as shown in FIG. 1 results in fuel filter 17 filtering only that fuel which reaches pressure regulator 10 for consumption by the engine. That is, any other fuel is returned to fuel tank 12 by bypass regulator 23. Thus, the life of fuel filter 17 is enhanced over fuel delivery systems which filter all fuel pumped by the system's fuel pump.

Referring additionally to FIG. 2, fuel pressure regulator 10 will be described in detail. Pressure regulator 10 includes a housing 24, from which extend fuel inlet 26 and fuel outlet 28. Fuel inlet 26 is at one end of a fuel inlet member 29. The periphery of a diaphragm assembly 32 and a crimp ring 35 are crimped onto housing 24. A cover 30 is also crimped onto housing 24, with the inclusion of suitable gasket material to prevent leaks through the crimped joint. Diaphragm assembly 32 defines a lower chamber 34 and an upper chamber 36 within pressure regulator 10. Diaphragm assembly 32 includes a flexible diaphragm 33.

Downstream from fuel inlet 26 is valve spring 38. Valve spring 38 is a compression spring which exerts force in the upward direction as viewed in FIG. 2. Valve spring 38 bears against valve ball 40. Valve ball 40 is disposed in opposition to valve seat 42.

Valve seat 42 is located at one end (the lower end as viewed in FIG. 2) of fuel passage 44. As can be seen in FIG. 2, if valve ball 40 is moved upward to seat against valve seat 42, fuel passage 44 will be sealed against flow of fuel from fuel inlet 26. Fuel passage 44 is integrally included in a fuel passage member 45.

Disposed within fuel passage 44 is a fluted pin 46. Fluted pin 46 is illustrated in detail with additional reference to FIG. 3. In this embodiment of the present invention, fluted pin 46 has four lobes 47 and four axial flutes 49. Fluted pin 46 is designed to be rigid, preferably being made from metal.

Fluted pin 46 has an outside diameter across lobes 47 which is only slightly smaller than the diameter of fuel passage 44. As a result, fluted pin 46 is laterally supported by fuel passage 44. This lateral support promotes repeatability of operation of pressure regulator 10. Flutes 49 make fluted pin 46 porous to fuel flow through fuel passage 44. Therefore, if valve ball 40 is not seated against valve seat 42, fuel can flow upward past fluted pin 46 and into lower chamber 34 of pressure regulator 10.

Diaphragm assembly 32 includes a body 48, the lower side of which bears against the upper end of fluted pin 46. Bearing against the upper side of diaphragm assembly 32 is a main spring 50, seated in a seat 51. Main spring 50 is located in upper chamber 36 of pressure regulator 10. Main spring 50 is in compression, thereby exerting a force which resists upward movement of diaphragm assembly 32.

In the preferred embodiment of the present invention, fluted pin 46 is mechanically coupled neither to diaphragm assembly 32 nor to valve ball 40. Fluted pin 46 merely bears against each of these components. Such a configuration has the advantage that close tolerances need not be maintained in the production of pressure regulator 10. If fluted pin 46 were attached to either diaphragm assembly 32 or valve ball 40, precise alignment of these components would be important to prevent fluted pin 46 from becoming skewed in fuel passage 44. One result of such skewing could be increased friction preventing fluted pin 46 from moving up and down freely.

A further advantage of the use of valve ball 40 is that it is very inexpensive relative to alternative valve-stopper mechanisms.

Communicating with lower chamber 34 of pressure regulator 10 is the aforementioned fuel outlet 28.

A port 52 communicates with upper chamber 36 of pressure regulator 10. Port 52 can be left open, thereby exposing upper chamber 36 to atmospheric pressure, if it is desired that pressure regulator 10 regulate to a constant pressure in fuel rail 20. If instead it is desired for the pressure in fuel rail 20 to vary with manifold vacuum, thus resulting in a constant fuel pressure across fuel injectors 22, port 52 can be connected to a source of manifold vacuum.

Fuel pressure regulator 10 operates as follows. With the entire fuel system unpressurized, the force of main spring 50 overcomes the force of valve spring 38. Thus, valve ball 40 is forced down by fluted pin 46 such that fuel flow can occur from fuel inlet 26 to fuel outlet 28 (that is, the valve comprising valve ball 40 and valve seat 42 is fully open). When fuel pump 14 begins to pump fuel, that fuel accordingly flows through pressure regulator 10 to fuel rail 20. Notice that even in its most downward position, body 48 of diaphragm assembly 32 does not seal the top of fuel passage 44.

Once the fuel pressure in lower chamber 34 approaches the pressure at which pressure regulator 10 is designed to regulate, the fuel pressure in lower chamber 34 will cause diaphragm assembly 32 to deflect upward. When this occurs, valve spring 38 forces valve ball 40 toward valve seat 42. This reduces the fuel flow through fuel passage 44, thereby reducing the pressure in lower chamber 34. If the fuel pressure in lower chamber 34 reaches a high enough pressure, through the fuel injectors 22 closing due to a hard deceleration or otherwise, valve ball 40 may fully close against valve seat 42.

When the fuel pressure in lower chamber 34 has reduced below the point at which pressure regulator 10 is designed to regulate, diaphragm assembly 32 can again move downward. When this occurs, fluted pin 46 pushes valve ball 40 away from valve seat 42, allowing greater fuel flow from fuel inlet 26 to fuel outlet 28 and increasing the pressure in lower chamber 34.

Through the ongoing process of fluted pin 46 and valve ball 40 moving upward and downward as necessary, the fuel pressure at fuel outlet 28 is maintained in regulation. When the engine in which this fuel system is installed is then turned off, a rise in pressure occurs in fuel rail 20. This rise occurs due to abrupt turning off of fuel injectors 22. This rise in pressure in fuel rail 20 is also present in lower chamber 34. Diaphragm assembly 32 is thus forced upward, closing the valve which comprises valve ball 40 and valve seat 42. Pressure regulator 10 thus acts to hold pressure in fuel rail 20 after the engine is turned off.

An additional feature of fuel pressure regulator 10 which may come into use at this time (that is, after the engine is turned off and the valve comprising valve ball 40 and valve seat 42 is closed) is an overpressure relief function. Overpressure in fuel rail 20 can be a concern if underhood temperatures are high (a so-called "hot soak" condition).

To allow the relief of such an overpressure condition, valve spring 38 is sized such that the following overpressure relief function will occur as necessary. The pressure in lower chamber 34 will act via passage 44 and against valve ball 40. (Note that body 48 is probably not in contact with fluted pin 46 at this time. Valve ball 40 was already in its fully upward position, and the pressure in lower chamber 34 has increased further due to the hot soak condition.) If the force exerted by the pressure in lower chamber 34 is greater than the upward force exerted by valve spring 38 and the fuel pressure in fuel inlet 26, valve ball 40 will move downward a small amount. In this way, the overpressure in fuel rail is relieved, with pressure relief valve 27 also opening if the pressure in fuel line 16 rises sufficiently. Preferably, valve spring 38 is sized such that overpressure relief occurs when the pressure in lower chamber 34 is about five pounds per square inch above the pressure at fuel inlet 26.

A further feature of pressure regulator 10 is in diaphragm assembly 32 and main spring 50 acting as an accumulator to damp pressure spikes which occur in fuel rail 20 while the fuel system is operating. That is, diaphragm assembly 32 can move upward in the event of such pressure spikes. This movement is facilitated by the lack of mechanical attachment between diaphragm assembly 32, fluted pin 46 and valve ball 40.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A fluid pressure regulator comprising:

an upper chamber and a lower chamber separated by a flexible diaphragm assembly;

a fluid passage having a first end and a second end, said first end communicating with said lower chamber;

a rigid member disposed within said fluid passage, said rigid member having a first end and a second end, said first end bearing against said diaphragm assembly, said rigid member further being porous to fluid flow through said fluid passage;

a valve sear located at said second end of said fluid passage;

a valve ball bearing against said second end of said rigid member;

a valve spring exerting a force on said valve ball toward said valve seat;

a main spring exerting a force on said diaphragm assembly opposing movement of said diaphragm assembly toward said upper chamber;

a fluid inlet member having a first end and a second end;

a fluid inlet at said first end of said fluid inlet member, said fluid inlet in communication with said fluid passage when said valve ball is away from said valve seat and not in communication with said fluid passage when said valve ball is seated against said valve seat; and a fluid outlet communicating with said lower chamber;

wherein said fluid passage is integrally formed in a fluid passage member, and said fluid passage member is coupled to said fluid inlet member such that said fluid passage and said fluid inlet are coaxially aligned;

wherein said fluid passage member has a transverse opening at said first end of said fluid passage;

wherein with said diaphragm assembly resting on said fluid passage member at said first end of said fluid passage, fluid flows from said fluid inlet to said fluid outlet via substantially an entire length of said rigid member and said transverse opening.

2. A fluid pressure regulator as recited in claim 1, wherein said rigid member is mechanically coupled to neither said diaphragm assembly nor said valve ball.

3. A fluid pressure regulator as recited in claim 2 wherein said rigid member is a pin having axial flutes.

4. A fluid pressure regulator as recited in claim 3 wherein said pin substantially prevents fluid flow through said fluid passage but for said flutes.

5. A fluid pressure regulator as recited in claim 4 wherein said springs are selected such that said valve ball is moved away from said valve seat if a fluid pressure in said lower chamber is less than a predetermined value relative to a pressure in said upper chamber.

6. A fluid pressure regulator as recited in claim 1 wherein said springs are selected such that said valve ball is moved away from said valve seat if a fluid pressure in said lower chamber is less than a predetermined value relative to a pressure in said upper chamber.

7. A fluid pressure regulator as recited in claim 6 wherein said valve spring is selected such that said valve ball is moved away from said valve seat if said fluid pressure in said lower chamber is greater than a fluid pressure at said fluid inlet by more than a predetermined amount.

8. A fluid pressure regulator as recited in claim 7 wherein said rigid member is a pin having axial flutes.

9. A fluid pressure regulator as recited in claim 8 wherein said pin substantially prevents fluid flow through said fluid passage but for said flutes.

10. A fluid pressure regulator comprising:

an upper chamber and a lower chamber separated by a flexible diaphragm assembly;

a fluid passage having a first end and a second end, said first end communicating with said lower chamber;

a rigid member disposed within said fluid passage, said rigid member having a first end and a second end, said first end bearing against said diaphragm assembly, said rigid member further being porous to fluid flow through said fluid passage;

a valve seat located at said second end of said fluid passage;

a valve stopper bearing against said second end of said rigid member;

a valve spring exerting a force on said valve stopper toward said valve seat;

a main spring exerting a force on said diaphragm assembly opposing movement of said diaphragm assembly toward said upper chamber;

a fluid inlet member having a first end and a second end;

a fluid inlet at said first end of said fluid inlet member, said fluid inlet in communication with said fluid passage when said valve stopper is away from said valve seat and not in communication with said fluid passage when said valve stopper is seated against said valve seat;

a fluid outlet communicating with said lower chamber;

wherein said rigid member is mechanically coupled to neither said diaphragm assembly nor said valve stopper;

wherein said fluid passage is integrally formed in a fluid passage member, and said fluid passage member is coupled to said fluid inlet member such that said fluid passage and said fluid inlet are coaxially aligned;

wherein said fluid passage member has a transverse opening at said first end of said fluid passage;

wherein with said diaphragm assembly resting on said fluid passage member at said first end of said fluid passage, fluid flows from said fluid inlet to said fluid outlet via substantially an entire length of said rigid member and said transverse opening.

11. A fluid pressure regulator as recited in claim 10 wherein said rigid member is a pin having axial flutes.

12. A fluid pressure regulator as recited in claim 11 wherein said pin substantially prevents fluid flow through said fluid passage but for said flutes.

13. A fluid pressure regulator as recited in claim 10 wherein said springs are selected such that said valve stopper is moved away from said valve seat by said rigid member if a fluid pressure in said lower chamber is less than a predetermined value relative to a pressure in said upper chamber.

14. A fluid pressure regulator as recited in claim 13 wherein said valve spring is selected such that said valve stopper is moved away from said valve seat if said fluid pressure in said lower chamber is greater than a fluid pressure at said fluid inlet by more than a predetermined amount.

15. A fluid pressure regulator as recited in claim 14 wherein said rigid member is a pin having axial flutes.

16. A fluid pressure regulator as recited in claim 15 wherein said valve stopper is a generally spherical ball.

17. A fluid pressure regulator as recited in claim 16 wherein said pin substantially prevents fluid flow through said fluid passage but for said flutes.

18. A fluid pressure regulator comprising:

an upper chamber and a lower chamber separated by a flexible diaphragm assembly;

a fluid passage having a first end and a second end, said first end communicating with said lower chamber;

a fluted pin disposed within said fluid passage, said fluted pin having a first end and a second end, said first end bearing against said diaphragm assembly, said fluted pin substantially preventing fluid flow through said fluid passage but for said flutes;

a valve seat located at said second end of said fluid passage;

a valve ball, said valve ball bearing against said second end of said fluted pin;

a valve spring exerting a force on said valve ball toward said valve seat;

a main spring exerting a force on said diaphragm assembly opposing movement of diaphragm assembly toward said upper chamber;

a fluid inlet member having a first end and a second end;

a fluid inlet at said first end of said fluid inlet member, said fluid inlet in communication with said fluid passage when said valve ball is away from said valve seat and not in communication with said fluid passage when said valve ball is seated against said valve seat; and a fluid outlet passage communicating with said lower chamber;

wherein said fluid passage is integrally formed in a fluid passage member, and said fluid passage member is coupled to said fluid inlet member such that said fluid passage and said fluid inlet are coaxially aligned;

wherein said fluid passage member has a transverse opening at said first end of said fluid passage;

wherein with said diaphragm assembly resting on said fluid passage member at said first end of said fluid passage, fluid flows from said fluid inlet to said fluid outlet via substantially an entire length of said rigid member and said transverse opening.

19. A fluid pressure regulator as recited in claim 18 wherein said springs are selected such that said valve ball is moved away from said valve seat if a fluid pressure in said lower chamber is less than a predetermined value relative to a pressure in said upper chamber.

20. A fluid pressure regulator as recited in claim 19 wherein said valve spring is selected such that said valve ball is moved away from said valve seat if said fluid pressure in said lower chamber is greater than a fluid pressure at said fluid inlet by more than a predetermined amount.

* * * * *